United States Patent [19]

Mitchell

[11] Patent Number: 5,847,470
[45] Date of Patent: Dec. 8, 1998

[54] AUXILIARY MOTOR DRIVE SYSTEM

[76] Inventor: Herman Roosevelt Mitchell, 4930 Strathaven Dr., Dayton, Ohio 45424

[21] Appl. No.: 742,209

[22] Filed: Oct. 31, 1996

Related U.S. Application Data

[60] Provisional application No. 60/011,058 Feb. 2, 1996.

[51] Int. Cl.$^6$ ...................................................... B60L 11/02
[52] U.S. Cl. ........................... 290/45; 290/4 R; 290/4 D; 290/40 R; 290/40 A; 180/65.2; 180/65.4; 180/65.6
[58] Field of Search .................................. 180/65.2, 65.4, 180/65.6, 2.1, 53.8, 165; 290/4, 45, 40 A

[56] References Cited

U.S. PATENT DOCUMENTS

| | | | |
|---|---|---|---|
| 980,382 | 1/1911 | Willis | 290/45 |
| 1,076,172 | 10/1913 | Todd | 290/45 |
| 1,189,399 | 7/1916 | Skaggs | 310/75 D |
| 4,319,140 | 3/1982 | Paschke | 290/45 |
| 4,455,492 | 6/1984 | Guelpa | 290/45 |
| 4,721,861 | 1/1988 | Saito et al. | 290/4 R |
| 4,879,501 | 11/1989 | Haner | 318/645 |
| 4,951,769 | 8/1990 | Kawamura | 180/65.4 |
| 5,033,269 | 7/1991 | Smith | 60/607 |
| 5,056,315 | 10/1991 | Jenkins | 60/614 |
| 5,079,913 | 1/1992 | Kishishita | 60/597 |
| 5,083,037 | 1/1992 | Pugnet | 290/4 R |
| 5,172,006 | 12/1992 | Suzuki et al. | 290/45 |
| 5,285,111 | 2/1994 | Sherman | 290/4 |
| 5,373,198 | 12/1994 | Lopez Jimenez | 307/69 |
| 5,406,797 | 4/1995 | Kawamura | 60/608 |
| 5,415,603 | 5/1995 | Tuzuki et al. | 477/5 |
| 5,489,001 | 2/1996 | Yang | 180/65.2 |
| 5,495,912 | 3/1996 | Gray, Jr. et al. | 180/165 |
| 5,558,173 | 9/1996 | Sherman | 180/53.8 |
| 5,582,262 | 12/1996 | Wust | 180/2.1 |
| 5,584,174 | 12/1996 | Bates et al. | 60/39.161 |
| 5,643,119 | 7/1997 | Yamaguchi et al. | 475/5 |
| 5,667,029 | 9/1997 | Urban et al. | 180/65.2 |
| 5,704,440 | 1/1998 | Urban et al. | 180/65.2 |

*Primary Examiner*—Nestor Ramirez
*Assistant Examiner*—Elvin G. Enad

[57] ABSTRACT

An auxiliary motor drive system including a driving device and an auxiliary motor. The driving device is powered by the engine of a motor vehicle and in turn drives the auxiliary motor. The auxiliary motor in turn drives the drive shaft of the motor vehicle, thus allowing the engine power output to be applied to the vehicle drive shaft while bypassing the vehicle's transmission. The driving device can be a hydraulic pump, a compressor, or an electric generator, while the auxiliary motor is a hydraulic motor, a pneumatic motor, or an electric motor respectively.

17 Claims, 6 Drawing Sheets

AUXILIARY MOTOR DRIVE SYSTEM

CROSS REFERENCE TO RELATED APPLICATION

This application is based on provisional patent application Ser. No. 60/011,058, filed Feb. 20, 1996.

BACKGROUND OF THE INVENTION

1. FIELD OF THE INVENTION

The present invention relates to hybrid motor vehicle. More specifically, the invention is an auxiliary motor and control system that will reduce the required output from an engine to operate a motor vehicle.

2. INTRODUCTION AND DESCRIPTION OF THE PRIOR ART

Most over-the-road vehicles have a limited number of gear ratios. In addition, most over-the-road vehicles have engines that are sufficiently powerful so as to allow the vehicle to accelerate reasonably fast and to climb uphill. Generally, far less power is required to maintain a vehicle at cruising speed than is required for acceleration and climbing uphill. Because of the limited number of available gear ratios, it is often impossible to match the engine rotational speed or engine RPM to the power requirements of the vehicle at a given cruising speed. Therefore, at cruising speeds the vehicle's engine often does not run at an optimum RPM. In general, because the power required to maintain a given cruising speed is relatively low, the engine can produce the power required for maintaining cruising speed at a much lower RPM than permitted by the gearing of the vehicle transmission. The auxiliary motor drive system of the present invention overcomes the inefficiencies inherent in automotive transmissions by directing the engine power output to the drive shaft of the vehicle in a manner that bypasses the vehicle's transmission. The present invention uses an auxiliary motor in conjunction with an internal combustion engine. The auxiliary motor can be of a hydraulic, pneumatic, or electric type. Hybrid propulsion systems which use an internal combustion engine in conjunction with an auxiliary motor to propel a vehicle have been proposed in the prior art, however none of the prior art systems are designed to function in the same manner as the auxiliary motor drive system of the present invention.

U.S. Pat. No. 980,382, issued to Samuel T. Willis on Jan. 3, 1911, shows a vehicle wherein the engine exhaust is directed to an accumulator. When sufficient pressure is built up in the accumulator, the exhaust gas is directed to a turbine which can drive the rear axle. The rear axle is also driven by the drive shaft driven by the engine. The auxiliary drive of Willis can be used for either propulsion or braking, and when the pressure in the accumulator becomes adequate, the main engine is cut off, permitting the vehicle to be propelled entirely by the gases in the accumulator until the pressure in the accumulator drops to an insufficient level. Willis does not show a pump or electrical generator driven by an engine, while the pump or generator drives a motor which in turn helps to drive the drive shaft of a vehicle.

U.S. Pat. No. 1,076,172 issued to James Todd on Oct. 21, 1913, shows a system for utilizing the exhaust of an engine wherein the exhaust gases are used to drive double acting pistons disposed within auxiliary cylinders. Todd does not show a pump or electrical generator driven by an engine, while the pump or generator drives a motor which in turn helps to drive the drive shaft of a vehicle.

U.S. Pat. No. 1,189,399, issued to George E. Skaggs on Jul. 4, 1916, shows an engine where the exhaust gases are accumulated in a pressure tank and used to drive a turbine which in turn helps to drive the output shaft of the engine. The output shaft is also driven directly by the reciprocating piston of the engine. Skaggs does not show a pump or electrical generator driven by an engine, with the pump or generator in turn helping to drive the drive shaft of a vehicle.

U.S. Pat. No. 4,319,140 issued to Ralph W. Paschke on Mar. 9, 1982, shows a demand operated power management drive system for motor vehicles. The system utilizes an electric traction motor, either by itself or in conjunction with an internal combustion engine, to propel a motor vehicle. The electric traction motor is the primary power source driving the drive shaft when the vehicle is accelerating, and the power contributed by the electric traction motor diminishes as the vehicle reaches cruising speed. Unlike the system of Paschke, the power contributed by the auxiliary motor of the present invention is at its peak when the vehicle is at cruising speed.

U.S. Pat. No. 4,455,492, issued to Jean Guelpa on Jun. 19, 1984, shows a hybrid power system for an automobile. The hybrid power system of Guelpa includes a motor/generator, a battery, and an internal combustion engine. The motor/generator only assists the engine at low RPM or during acceleration, while the motor/generator recharges the battery during deceleration. Guelpa does not show a hybrid power system that reduces engine power demand at cruising speed.

U.S. Pat. No. 4,721,861, issued to Suzuo Saito et al. on Jan. 26, 1988, shows an apparatus where an AC motor is coupled to the same axle as a turbine and acts as a helper motor to the turbine. Saito et al. do not show a pump or electrical generator driven by an engine, with the pump or generator in turn driving an auxiliary motor which helps to drive the drive shaft of a vehicle.

U.S. Pat. No. 4,879,501, issued to Lambert Haner on Nov. 7, 1989, shows a drive system for maintaining the shaft of an electrical generator at a constant speed. An internal combustion engine drives the generator through an electrohydraulically controlled variable displacement pump. The variable displacement pump in turn drives a hydraulic motor which drives the generator. A feed back control system ensures that the generator shaft is driven at constant speed by varying the displacement of the variable displacement pump. Haner does not show a pump or electrical generator driven by an engine, with the pump or generator in turn driving an auxiliary motor which helps to drive the drive shaft of a vehicle.

U.S. Pat. No. 5,033,269, issued to Roger R. Smith on Jul. 23, 1991, shows a compound power plant wherein the exhaust from an internal combustion engine is used to drive a turbine. The output shaft of the turbine drives a compressor and is also coupled to the same gear train as the output shaft of the internal combustion engine. Clutch means couples or decouples the output shaft of the turbine from the compressor and the gear train depending on the torque exerted on the turbine by the exhaust gas from the engine. Smith does not show a pump or electrical generator driven by an engine, with the pump or generator in turn driving an auxiliary motor which helps to drive the drive shaft of a vehicle.

U.S. Pat. No. 5,056,315, issued to Peter E. Jenkins on Oct. 15, 1991, shows an engine where the hydrocarbons in the engine exhaust are ignited generating pressurized gas which is used to drive a turbine. The turbine in turn helps to drive, via a gear train, the output shaft of the engine. Jenkins does not show a pump or electrical generator driven by an engine, with the pump or generator in turn driving an auxiliary motor which helps to drive the drive shaft of a vehicle.

U.S. Pat. No. 5,079,913, issued to Keiji Kishishita on Jan. 14, 1992, shows an automotive power plant where the exhaust of an internal combustion engine is used to drive a turbine. The output shaft of the turbine drives, via a generator and an electromagnetic clutch, a gear train engaged to the engine flywheel. The output of the generator charges a battery. A rotary electric machine is also mechanically linked, via a gear set, to the engine flywheel. The rotary electric machine charges the battery when operated in a generator mode, and the rotary electric machine drives the engine flywheel when operated in a motor mode using electrical energy supplied by the battery. At higher rotational speeds the turbine directly helps drive the engine flywheel, while at lower rotational speeds the turbine charges the battery as the rotary electric machine is used as a motor. The rotary electric machine of Kishishita does not engage the drive shaft of a vehicle. Further, the contribution of the rotary electric machine of Kishishita to driving the flywheel of the engine diminishes at cruising speeds, which is the reverse of the situation in the present invention.

U.S. Pat. No. 5,083,037, issued to Jean-Marc Pagnet on Jan. 21, 1992, shows a device for controlling the operation of two engines coupled to the same drive shaft. A speed regulator is used to adjust two proportional actuators which function as a means of controlling the injection of fuel into the engines. The drive shaft is connected to an alternator for generating emergency power. Pagnet does not show a pump or electrical generator driven by an engine, with the pump or generator in turn driving an auxiliary motor which helps to drive the drive shaft of a vehicle.

U.S. Pat. No. 5,172,006, issued to Takayuki Suzuki et al. on Dec. 15, 1992, shows an electric braking and auxiliary engine mechanism which performs braking and provides auxiliary driving power for motor vehicles. The mechanism includes a rotary electric machine, such as a squirrel-cage polyphase induction machine, coupled to the crank shaft of the internal combustion engine. The squirrel-cage polyphase induction machine can act as a generator when braking and as a motor when auxiliary power is needed, for example, during acceleration and climbing uphill. In the Suzuki et al. system the squirrel-cage polyphase induction machine is supplied by a battery when the squirrel-cage polyphase induction machine is being used as a motor. Unlike the present invention, the Suzuki et al. system does not have a separate generator supplying the auxiliary motor when the vehicle is running at cruising speeds.

U.S. Pat. No. 5,285,111, issued to James F. Sherman on Feb. 8, 1994, discloses a power transmission system that is interposed between the internal combustion engine and the drive ratio selection transmission of a motor vehicle. The power transmission selectively adds or subtracts torque provided by a motor/generator to the torque provided by the internal combustion engine via compounded planetary gear sets. Sherman does not show a generator, run by the internal combustion engine, powering an auxiliary motor which helps drive the drive shaft of a vehicle.

U.S. Pat. No. 5,373,198, issued to Miguel Lopez Jimenez on Dec. 13, 1994, shows an emergency generator system that starts a diesel engine in order to generate electricity when there is a disruption of power supply from the electric utility. A hydraulic motor is used to spin the emergency generator input shaft at the proper speed until the diesel engine attains the proper working speed. Jimenez does not show a pump or electrical generator driven by an engine, while the pump or generator drives a motor which in turn helps to drive the drive shaft of a vehicle.

U.S. Pat. No. 5,415,603, issued to Shigeo Tuzuki et al. on May 16, 1995, shows a transmission for a hybrid vehicle that selectively engages either an internal combustion engine or an electric motor to the drive wheels of the vehicle. Tuzuki et al. do not show a generator, run by the internal combustion engine, powering an auxiliary motor which helps drive the drive shaft of a vehicle.

None of the above inventions and patents, taken either singly or in combination, is seen to describe the instant invention as claimed.

SUMMARY OF THE INVENTION

The present invention is an auxiliary motor and control system that will allow engine power to be applied to the drive shaft, also known in the art as the propeller shaft, of a vehicle while bypassing the vehicles transmission. The auxiliary motor drive system of the present invention includes a driving device such as a generator, a hydraulic pump, or a compressor, which is powered by the engine. The driving device in turn drives an auxiliary motor corresponding in type to the driving device used. The auxiliary motor then in turn drives a vehicle drive shaft. The output torque of the engine passes through the transmission in the normal manner to provide the necessary power to accelerate a motor vehicle from a resting position. Once a cruising speed is achieved, the auxiliary motor is engaged which bypasses the vehicles transmission and allows the engine to be operated at or near the idling speed while the speed of the vehicle is maintained at the same cruising speed. Because the vehicle now operates at a lower RPM, the amount of fuel consumed and of the exhaust gases emitted by the engine are reduced.

Accordingly, it is a principal object of the invention to provide an auxiliary motor and control system which may be incorporated into the propulsion system of a motor vehicle to allow the vehicle's engine to operate at a reduced RPM when the vehicle is cruising at a relatively constant speed.

It is another object of the invention to provide an auxiliary motor and control system which will reduce the pollutant emissions generated by the internal combustion engine of a motor vehicle during operation of the motor vehicle.

It is a further object of the invention to provide an auxiliary motor and control system which reduces the amount of fuel consumed by the internal combustion engine of a motor vehicle during operation of the motor vehicle.

Yet another object of the invention is to provide an auxiliary motor and control system which can be easily installed in existing motor vehicles or be incorporated into the propulsion system of newly designed motor vehicles.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
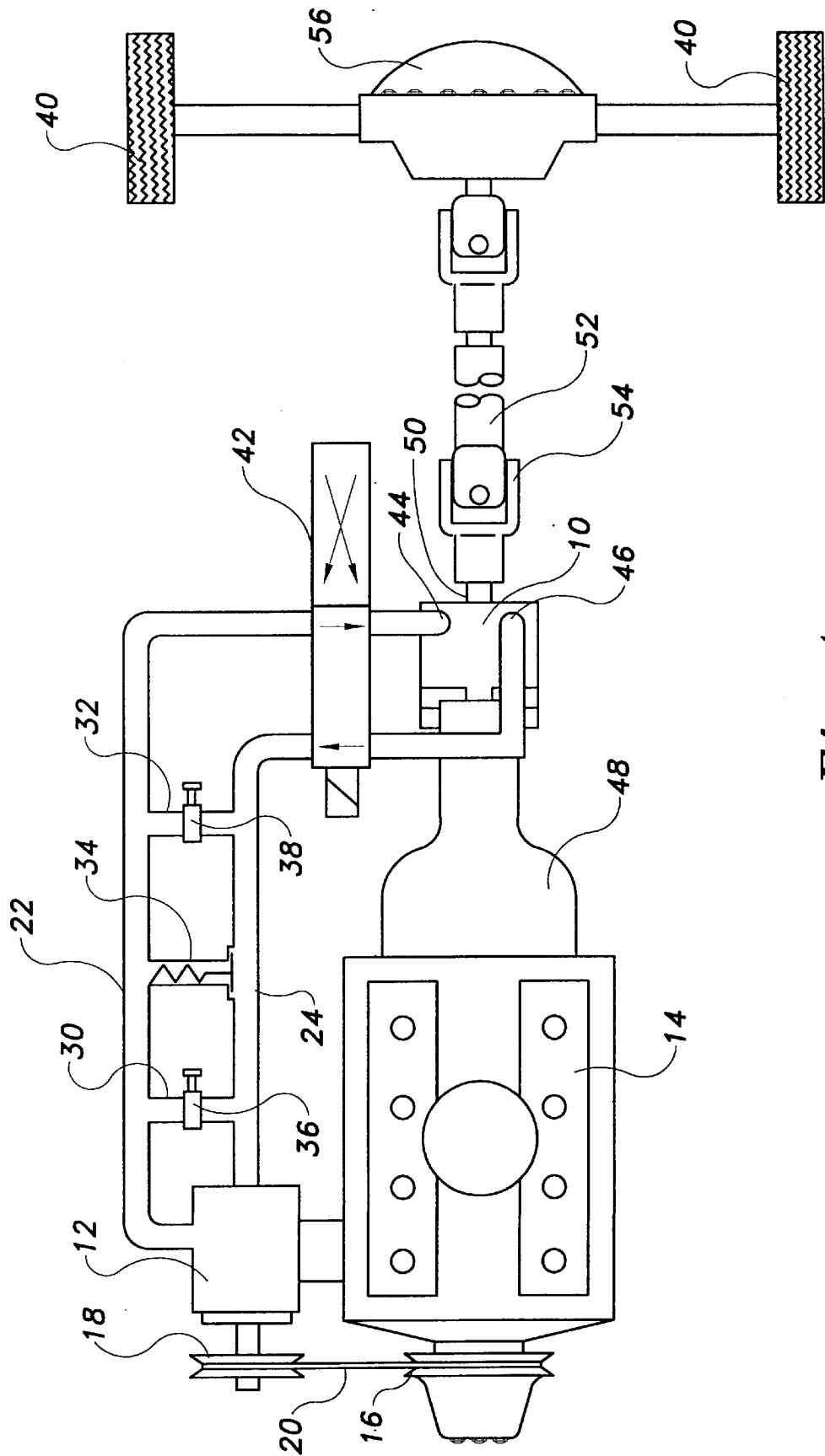
FIG. 1 is a schematic diagram of the auxiliary motor drive system of the present invention using a fluid driven motor, shown incorporated into a motor vehicle.

Referring to FIG. 1, an embodiment of the present invention using a fluid driven auxiliary motor can be seen. The embodiment of FIG. 1 shows the auxiliary motor drive system of the present invention applied to an existing rear wheel drive vehicle. The auxiliary motor drive system includes an auxiliary motor 10, a driving device 12 for driving the motor 10, and various control valves that will be described later.

The driving device 12 is mounted to the vehicle or to the internal combustion engine 14 using well known conventional means. The driving device 12 is located relative to the engine 14 such that the driving device 12 can engage the engine 14 so as to derive power from the engine 14. For example, the driving device 12 can run off of the serpentine belt that normally runs the water pump and alternator of the engine. Alternatively, the driving device 12 can run off of the crank shaft of engine 14 by a system of gears, pulleys and a belt, or sprockets and a chain. In addition, the driving device 12 can be engaged by well known means to the cam shaft, the timing chain, or the cooling fan drive shaft so as to derive power from these components. In the embodiment of FIG. 1, the driving device 12 derives power from the crank shaft of the engine 14 using pulleys 16 and 18 and the belt 20. Also in the embodiment of FIG. 1, the driving device 12 can be a hydraulic pump or a compressor which is also known as a pneumatic pump. Therefore, depending upon the type of driving device used as the driving device 12, the motor 10 will either be a hydraulic motor or a pneumatic motor.

In the discussion of the embodiment of FIG. 1 which follows, it should be noted that most of the same remarks apply equally to both the pneumatic and the hydraulic versions of the auxiliary motor drive system. The only differences between the hydraulic and pneumatic versions are that in the pneumatic auxiliary motor drive system the driving device 12 is a compressor, the motor 10 is a pneumatic motor, and the fluid used to drive the motor 10 is air, whereas in the hydraulic auxiliary motor drive system the driving device 12 is a hydraulic pump, the motor 10 is a hydraulic motor, and the fluid used to drive the motor 10 is hydraulic fluid. In both the pneumatic and hydraulic versions of the auxiliary motor drive system of the present invention, the motor 10 will have a rotating element to which momentum is imparted by the fluid used in the system.

The outlet of the driving device 12 communicates with a supply conduit 22. The conduit 22 conducts fluid under pressure to the inlet of the motor 10. The outlet of the motor 10 communicates with a return conduit 24 which in turn communicates with the inlet of the driving device 12. Conduit 24 allows the driving fluid to return from the motor 10 to the driving device 12 thus completing the fluid circuit connecting the driving device 12 and the motor 10.

Figure 5:
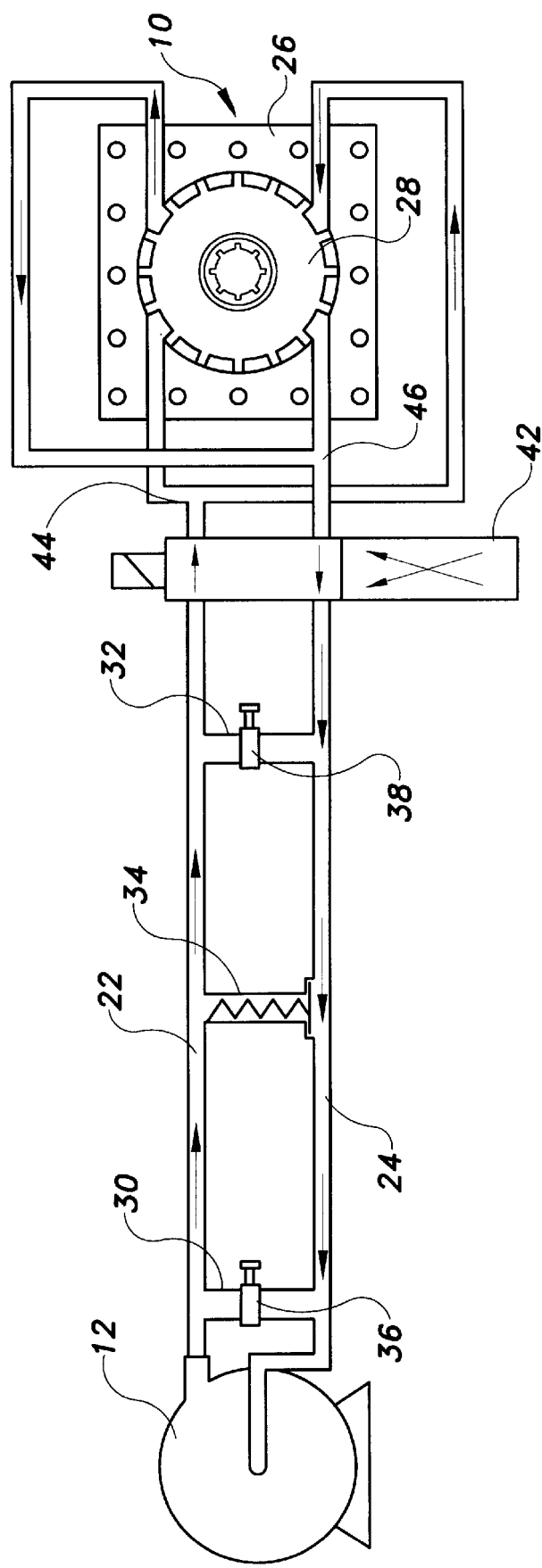
FIG. 5 is a schematic diagram showing details of the auxiliary motor drive system of the present invention using a fluid driven motor.

Referring to FIG. 5, a schematic diagram of the fluid circuit of the hydraulic version of the auxiliary motor drive of the present invention can be seen. The motor 10 has a housing 26 which houses a rotor 28. The rotor 28 is an example of a rotating element of the motor 10 which was referred to earlier. The inlet stream to the motor 10 is split into two and directed tangentially at the rotor 28 on opposite sides of the rotor 28, so as to cause the rotation of the rotor 28. After the split streams pass the rotor 28 they are again reunited at the outlet of the motor 10 and conducted back to the driving device 12 via the low pressure return conduit 24. It should be readily apparent that as the engine 14 drives the driving device 12 (see FIG. 1), driving fluid will be circulated through the conduits 22 and 24 thus imparting rotational motion to the rotor 28. Note that any well known hydraulic motor can be used in place of the one illustrated in FIG. 5, and no attempt will be made here to provide an exhaustive list of the suitable hydraulic motors because suitable alternative motors would readily be apparent to one skilled in the art. In the pneumatic version of the auxiliary motor drive system, the hydraulic motor 10 illustrated in FIG. 5 would be replaced by a pneumatic motor such as a centrifugal turbine. Again no attempt will be made here to provide an exhaustive list of suitable pneumatic motors.

Referring again to FIGS. 1 and 5, two conduits 30 and 32, and a pressure relief valve 34 bridge the conduits 22 and 24. A solenoid controlled on/off valve 36 controls fluid flow through the conduit 30. With the valve 36 open, the conduit 30 becomes a shunt between conduits 22 and 24 with the result that most of the output of the driving device 12 is shunted through the conduit 30. Thus with the valve 36 open, the torque imparted to the motor 10 will be negligible and the auxiliary motor drive system will effectively be off-line. The auxiliary motor drive system can be engaged by closing the valve 36, thus directing most of the output of the driving device 12 toward the motor 10 to thereby impart significant amounts of torque to the motor 10.

The pressure relief valve 34 is intended as a safety measure and allows driving fluid to be shunted from the supply conduit 22 to the return conduit 24 if the pressure in conduit 22 builds to dangerous levels that would threaten the integrity of the system. Under normal conditions the relief valve 34 is closed so that the flow of high pressure driving fluid to the motor 10 will not be affected by the relief valve 34. If the pressure in conduit 22 becomes too high, the relief valve 34 opens under the pressure of the fluid in conduit 22. The pressure relief valve 34 automatically resets to the closed position once the pressure in conduit 22 drops to safe levels.

An electrically controlled flow control valve 38 controls fluid flow through the conduit 32. With the valve 38 open, some of the output of the driving device 12 will bypass the motor 10 via the conduit 32. By varying the constriction (i.e. the resistance to flow) due to the valve 38, the amount of the output of the driving device 12 that bypasses the motor 10 can be varied. Thus the amount of torque imparted to the rotating element of the motor 10, and consequently the speed of the rotating element of the motor 10, can be controlled using the flow control valve 38. Naturally, full power can be applied to the motor 10 by completely closing the valve 38.

The valve 38 is also electrically actuated so that the valve 38 can be controlled by the operator of the vehicle from the passenger compartment. The valve 38, being electrically operated, can also be controlled automatically to have the effect of a cruise control. For example, a vehicle speed sensor can be used in conjunction with a microcomputer based controller (not shown) to vary the constriction due to the valve 38 to maintain the vehicle speed relatively constant. A simple feedback control scheme could then be used to vary the constriction due to the valve 38 in response to deviations of the vehicle speed from the operator selected cruising speed. For example, if the vehicle encounters a slight upward slope, more power will be required to maintain the same speed and consequently there will be a slight drop in speed. This slight drop in speed will be detected by the speed sensor and will be conveyed to the microcomputer based controller. In response, the microcomputer based controller will cause the valve 38 to be moved closer to the closed position, i.e. will cause the constriction in conduit 32 due to valve 38 to be increased. This action has the effect of directing more of the output of the driving device 12 to the motor 10, thus directing more power to the vehicle's drive wheels 40 in order to bring the vehicle's speed back up to the operator selected cruising speed. Conversely, if the vehicle encounters a slight downward slope, the vehicle will speed up due to the action of gravity and less power will be required to maintain the same speed. This slight increase in speed will be detected by the speed sensor and will be conveyed to the microcomputer based controller. In response, the microcomputer based controller will cause the valve 38 to be moved closer to the fully open position, i.e. will cause the constriction in conduit 32 due to valve 38 to be decreased. This action has the effect of directing more of the output of the driving device 12 away from the motor 10, thus directing less power to the vehicle's drive wheels 40 in order to bring the vehicle's speed back down to the operator selected cruising speed.

Both conduits 22 and 24 pass through a four way two position valve 42 just before the conduits connect to the motor 10. The valve 42 has two positions. In the first position, which is the normal operating position, valve 42 allows the conduit 22 to communicate with the inlet 44 of the motor 10 while allowing the conduit 24 to communicate with the outlet 46 of the motor 10. In the second position, the valve 42 allows the conduit 22 to communicate with the outlet 46 of the motor 10 while allowing the conduit 24 to communicate with the inlet 44 of the motor 10.

As with the valves 36 and 38, the valve 42 is also electrically actuated to allow the valve 42 to be controlled by the vehicle operator from the passenger compartment. Also the valve 42 may be put under the control of a microcomputer controller which switches the valve 42 to the second position upon braking. The microcomputer controller may sense braking using the same circuit which activates the brake light for example. As was stated previously, the valve 42 is in the first position during normal operation of the auxiliary motor drive system, e.g. when cruising at speed. In the second position the valve 42 effectively causes the motor 10 to act as a driving device working in opposition to the driving device 12, thus causing increased fluid-dynamic drag on the rotating element of the motor 10. This fluid-dynamic drag opposes the rotation of the rotating element of the motor 10. Therefore the fluid-dynamic drag tends to slow down the rotation of the rotating element of the motor 10, and thus the fluid-dynamic drag tends to slow down the vehicle itself. For this reason, the valve 42 is switched to the second position to aid in braking the vehicle.

Referring again to FIG. 1, the motor 10 operably engages the drive train of the vehicle between the gear ratio selection mechanism, i.e. the transmission 48, and the drive wheels 40 of the vehicle. Although in FIG. 1 the auxiliary motor drive system is shown added to a rear wheel drive vehicle, the auxiliary motor drive system can be applied to front wheel and all wheel drive vehicles also, provided that the motor 10 is mechanically interfaced with the vehicle's drive train between the gear ratio selection mechanism and the differential gear mechanism distributing power to the drive wheels.

The embodiment shown in FIG. 1 is suitable for retrofitting the auxiliary motor drive system to an existing vehicle. The motor 10 is bolted to the rear of the housing of the transmission 48 such that the rotor 28 is concentric with the output shaft of the transmission 48. A stub shaft 50 is connected to the output shaft of the transmission 48. The stub shaft 50 has external splines that matingly engage the internal splines of the center hole of the rotor 28 so that rotation of the rotor 28 causes the stub shaft 50 to rotate. The drive shaft 52 is then shortened and connected to the stub shaft 50 by a standard universal joint 54. The shortened drive shaft 52 then connects to the differential 56 in the normal manner and drives the drive wheels 40 as before. Thus rotation of the rotor 28 will cause the rotation of the drive wheels 40.

In operation, once the auxiliary motor drive system is installed, the vehicle can be started and operated in the same manner as before. When it is desired to engage the auxiliary motor drive system, the valve 36 is closed allowing the output of the driving device 12 to be applied to the motor 10. The auxiliary motor drive system can be engaged at any time without interfering with the normal operation of the vehicle. When engaged during acceleration or deceleration, the auxiliary motor drive system will aid the acceleration of the vehicle or aid with the braking of the vehicle respectively. The braking function of the auxiliary motor drive system is effected by the four way two position valve 42 as was described previously.

The auxiliary motor drive system is most efficient when the vehicle is cruising at highway speeds. To sustain the vehicle's speed using the auxiliary motor drive system, the auxiliary motor drive system is engaged by closing the valve 36, shifting the transmission into neutral, and removing pressure from the accelerator pedal. In class A vehicles, e.g. tractor trailers, it will not be necessary to shift the transmission into neutral because these vehicles have transmissions that automatically shift into neutral when the engine RPM drops below the level needed to sustain a given road speed at the selected gear ratio. When the auxiliary motor drive system is engaged under highway cruising conditions and the vehicle's transmission is shifted into neutral, the vehicle's cruising speed will be maintained while the engine RPM drops to a significantly reduced level. In fact the engine RPM may drop to a level at or near the idle RPM.

With the auxiliary motor drive engaged at a given cruising speed, the vehicle can maintain the same speed at less than about half the engine RPM that would be required in the absence of the auxiliary motor drive system. In some cases, the vehicle can maintain a cruising speed at an engine RPM that is about one fourth the engine RPM that would have been required to maintain that same cruising speed in the absence of the auxiliary motor drive system. Under such circumstances it would be expected that the number of miles traveled per gallon of fuel consumed would be roughly four times the number of miles obtained from a gallon of fuel without the use of the auxiliary motor drive system. In actual prototype testing the gas mileage obtained when using the auxiliary motor drive system was about three times the gas mileage obtained without using the auxiliary motor drive system at a cruising speed of sixty miles per hour. As an example, a vehicle's engine typically runs at about two thousand RPM at a cruising speed of sixty five miles per hour. Once the auxiliary motor drive system is engaged, the vehicle's engine speed would drop down to about five hundred RPM while maintaining the vehicle speed at the same sixty five miles per hour.

Figure 2:
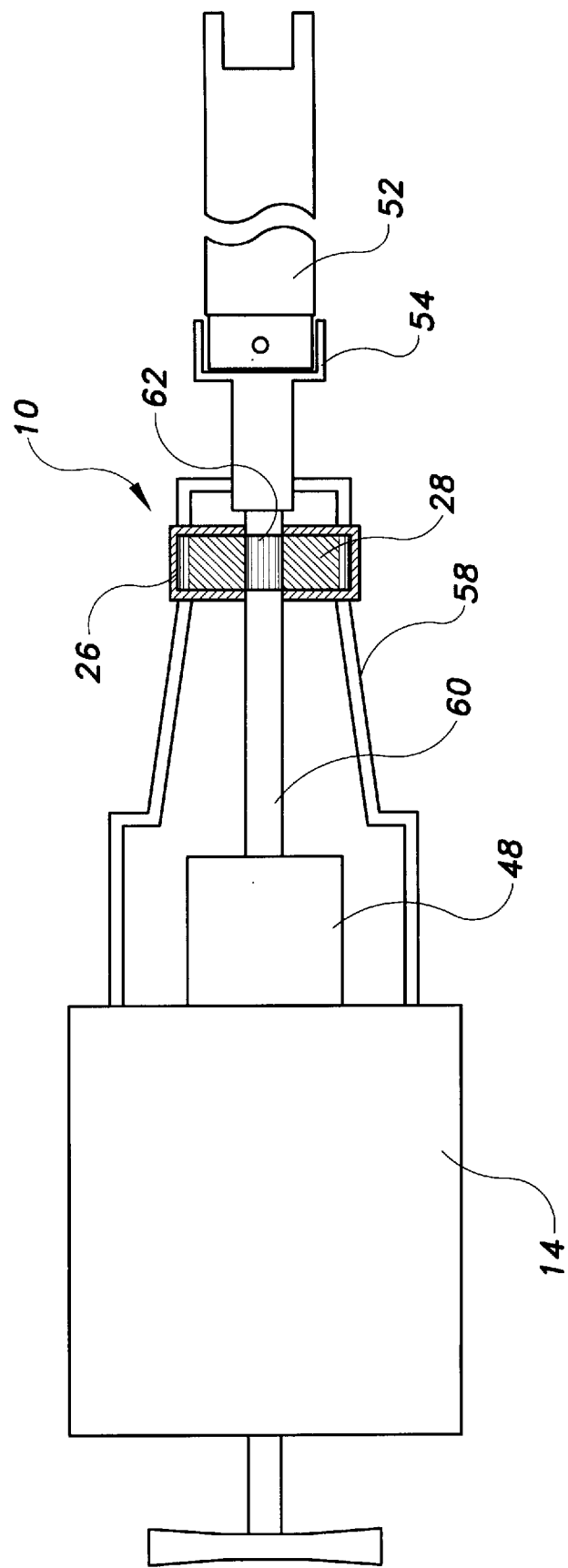
FIG. 2 is a schematic diagram showing the auxiliary motor of the present invention incorporated into the transmission housing of a motor vehicle.

Referring to FIG. 2, the motor 10 is shown incorporated into the housing 58 of the transmission or gear ratio selection mechanism 48. The embodiment of FIG. 2 is suitable for newly manufactured automobiles that integrally incorporate the auxiliary motor drive system. In the embodiment of FIG. 2, the rotor 28 is directly fixed to the transmission output shaft 60 between the gear ratio selection mechanism 48 and the universal joint 54. A portion 62 of the transmission output shaft 60 is splined so as to engage the internal splines of the center hole of the rotor 28. In order to utilize this configuration, the transmission must be adapted to accept the motor 10 by modifying the outer casing 58. This configuration has the advantage of utilizing the existing drive shaft 52 without having to shorten its length.

Figure 3:
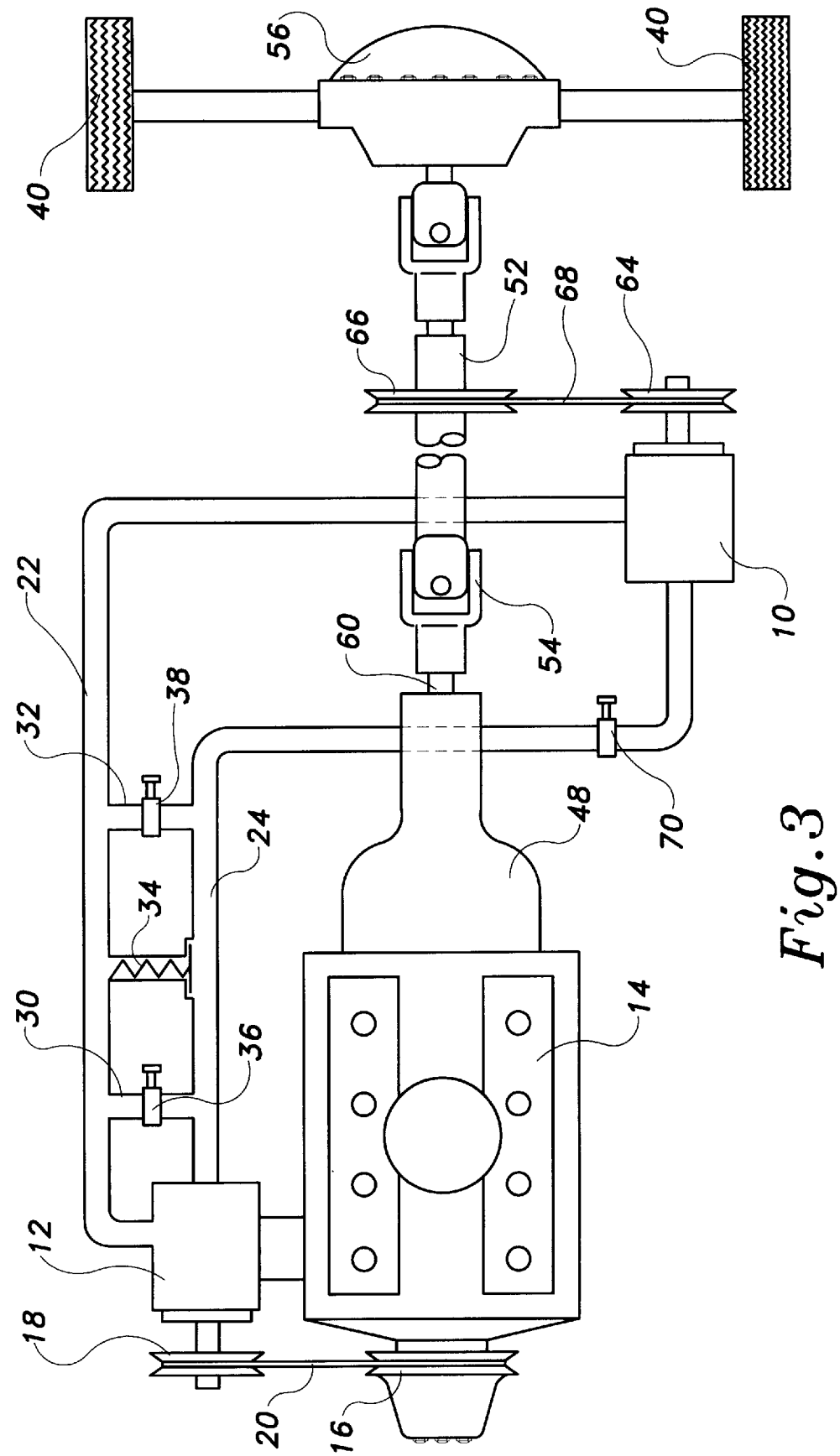
FIG. 3 is a schematic diagram of the auxiliary motor drive system of the present invention using a fluid driven motor coupled to the drive shaft via a belt drive system and using an alternative valving arrangement, shown incorporated into a motor vehicle.

Referring to FIG. 3, an alternative embodiment for retrofitting the auxiliary motor drive system to an existing vehicle can be seen. In this embodiment the motor 10 is mounted in an offset manner relative to the drive shaft 52. The motor 10 can for example be mounted to the vehicle body or chassis, to the transmission housing, or to the differential housing 56. The motor 10 then drives the drive shaft 52 using pulleys 64 and 66 and the belt 68. Also the valve 42 is replaced by a single flow control valve 70 provided in the fluid return conduit 24. As with all the other valves, the valve 70 can be electrically operated. The valve 70 is used when braking the vehicle. To slow down the vehicle the constriction in the valve 70 is increased by moving the valve toward the closed position, which increases the fluid-dynamic drag on the hydraulic or pneumatic circuit. Otherwise the embodiment of FIG. 3 is identical to that illustrated in FIG. 1. Also, it should be noted that the valve 42 can be used in combination with the motor location illustrated in FIG. 3, and similarly the valve 70 can be used in combination with the motor location illustrated in FIG. 1. All variations such as those described above are contemplated as being within the scope of the present invention.

Figure 4:
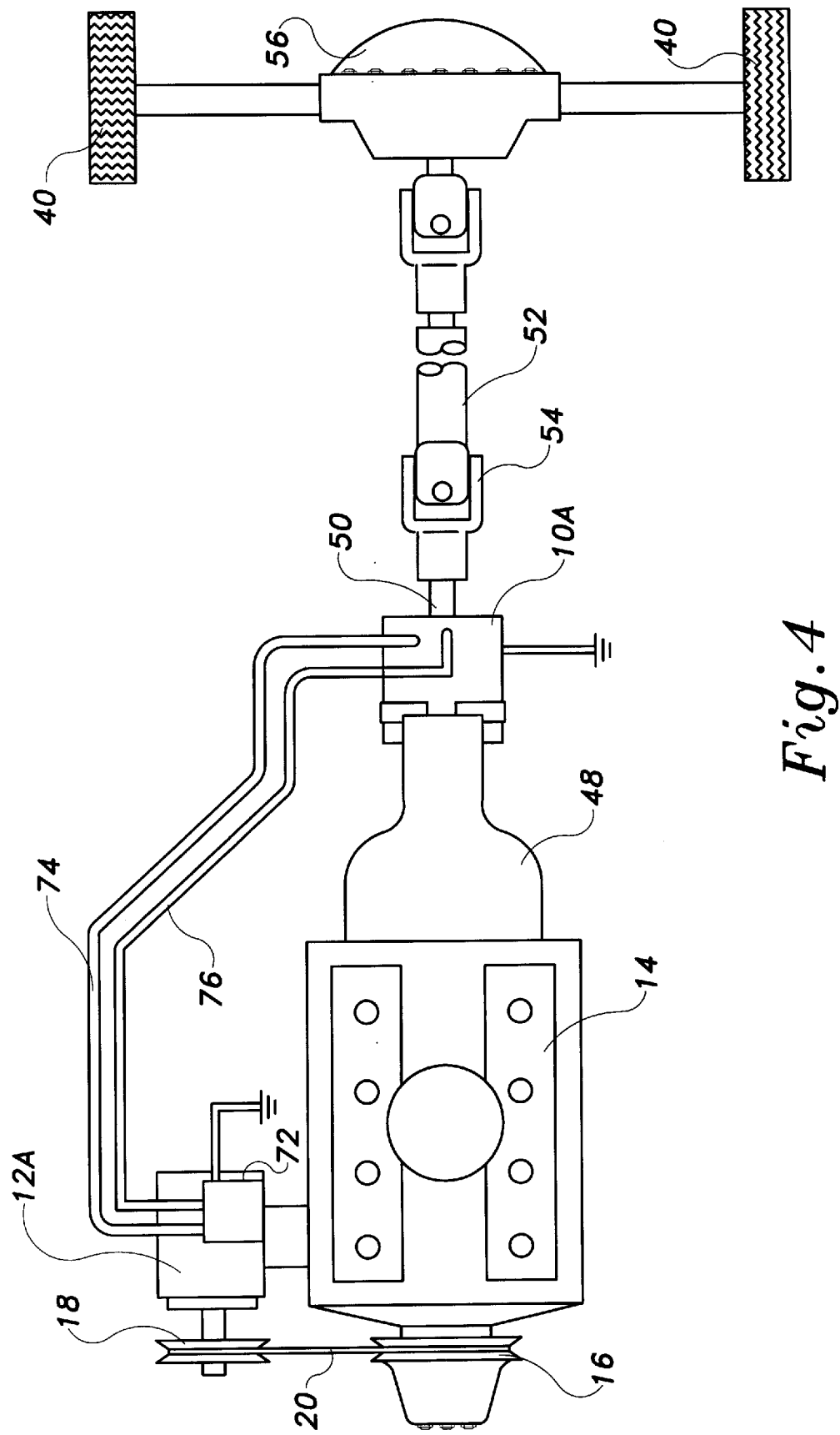
FIG. 4 is a schematic diagram of the auxiliary motor drive system of the present invention using an electric motor, shown incorporated into a motor vehicle.
Figure 6:
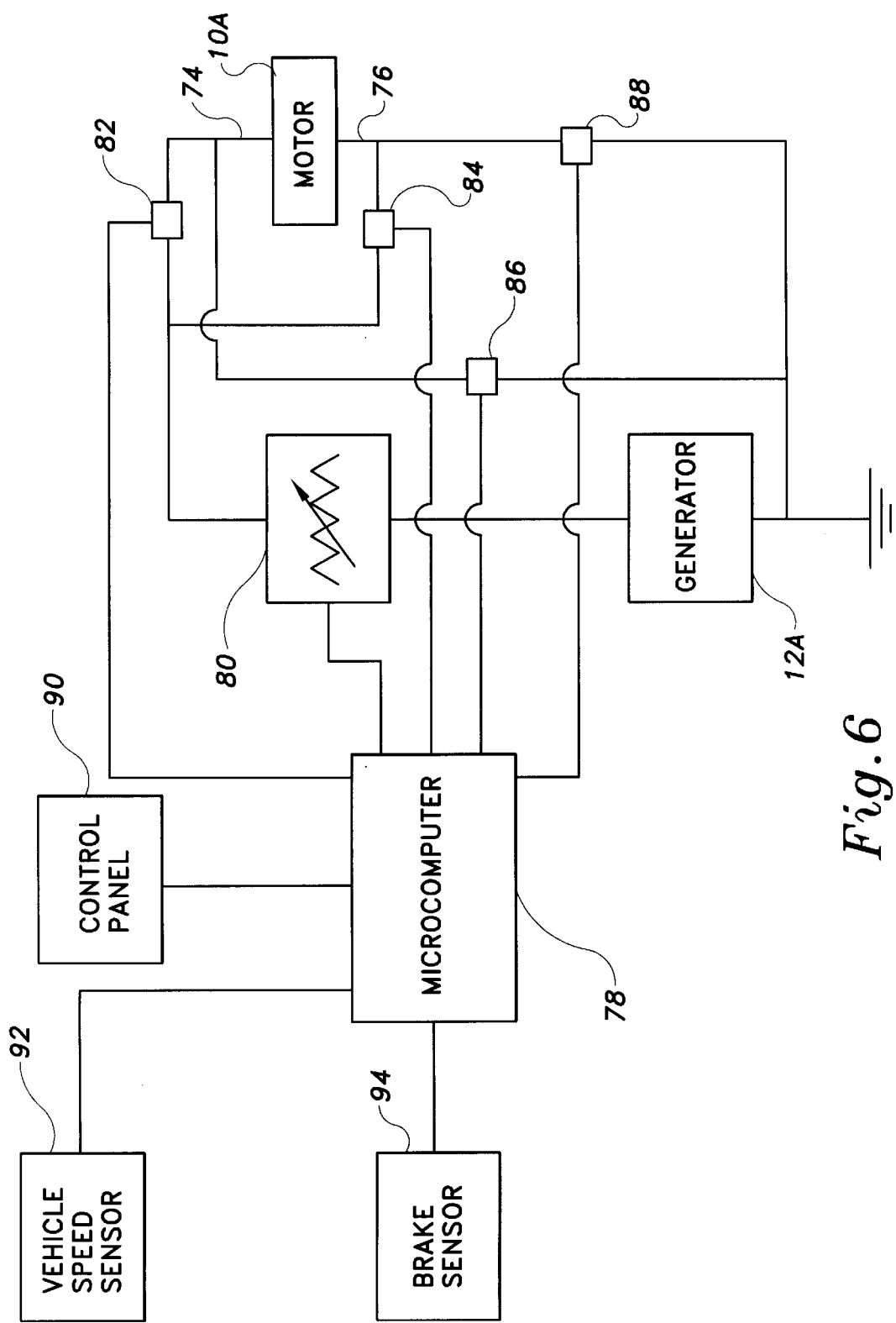
FIG. 6 is a block diagram of the control system of the electric version of the auxiliary motor drive system of the present invention.

Referring to FIGS. 4 and 6, the electric version of the auxiliary motor drive system can be seen. The electric version of the auxiliary motor drive system includes an electric auxiliary motor 10a, a driving device 12a which in this case is a generator, and a control system 72 that will be described later.

The generator 12a is mounted to the vehicle or to the internal combustion engine 14 using well known conventional means. The generator 12a is located relative to the engine 14 such that the generator 12a can engage the engine 14 so as to derive power from the engine 14. For example, the generator 12a can run off of the serpentine belt that normally runs the water pump and alternator of the engine. Alternatively, the generator 12a can run off of the crank shaft of engine 14 by a system of gears, pulleys and a belt, or sprockets and a chain. In addition, the generator 12a can be engaged by well known means to the cam shaft, the timing chain, or the cooling fan drive shaft so as to derive power from these components. In the embodiment of FIG. 4, the generator 12a derives power from the crank shaft of the engine 14 using pulleys 16 and 18 and the belt 20.

The motor 10a will have a rotating element to which momentum is imparted by the electrical current supplied by the generator 12a. The electrical current supplied by generator 12a is supplied to the motor 10a via the wires 74 and 76. The rotating element of the motor 10a is operably engaged to the drive train of the vehicle such that rotation of the rotating element of the motor 10a will impart rotational motion to the drive wheels 40. The mechanical power output of the motor 10a is preferably transmitted to the drive train of the vehicle at a location intermediate the gear ratio selection mechanism 48 and the drive wheels 40. Even more preferably, the mechanical power output of the motor 10a is transmitted to the drive train of the vehicle at a location intermediate the gear ratio selection mechanism 48 and the point at which power is distributed to the various drive wheels of the vehicle.

Similar to the motor 10, the electric motor 10a has a rotating element that can be engaged to the vehicle's drive train in any of the various ways described in the context of the fluid powered motor 10. The only difference between the motor 10 and the electric motor 10a is that the rotating element of the electric motor 10a is caused to rotate by the interaction of the electrical current passing through certain parts of the electric motor and the magnetic fields generated or existing within the electric motor, whereas the rotation of the rotating element of the fluid powered motor 10 is caused by fluid pressure.

Referring to FIG. 6, a schematic diagram of the control system for the electric version of the auxiliary motor drive system can be seen. The control system shown in FIG. 6 can also be used for the fluid driven versions with minor modifications. The modifications would include using the various switches shown in FIG. 6 to control the current for the operation of the various valves in the hydraulic or pneumatic circuits rather using those switches to directly control energy supply to the auxiliary motor.

The control system 72 includes a microcomputer 78, a rheostat 80, and switches 82, 84, 86, and 88. When the vehicle is being operated in the usual manner, the auxiliary motor drive system is off-line. In the off-line state the circuit between the generator 12a and the motor 10a is open so that no current can flow to the motor 10a. A control panel 90 is located in the passenger compartment to allow a vehicle operator to control the functions of the auxiliary motor drive system.

Using the control panel 90 the operator can engage the auxiliary motor drive system at any time. Manipulating the appropriate switch on the control panel 90 will cause control signals to be sent from the microcomputer 78 to the switches 82 and 88, closing the switches 82 and 88. The Switches 84 and 86 will remain open. Current from the generator 12a will now flow to the motor 10a, thus imparting torque to the rotating element of the motor 10a. The amount of the current flowing from the generator 12a to the motor 10a can be varied using the rheostat or variable resistance device 80. Therefore, the device 80 can be used to control the amount of power supplied to the motor 10a. When engaged during acceleration, the auxiliary motor drive system will aid the acceleration of the vehicle.

The auxiliary motor drive system is most efficient when the vehicle is cruising at highway speeds. To sustain the vehicle's speed using the auxiliary motor drive system, the auxiliary motor drive system is engaged by closing the 82 and 88, while maintaining switches 84 and 86 open. Then the transmission 48 is shifted into neutral, and pressure is removed from the accelerator pedal. In class A vehicles, e.g. tractor trailers, it will not be necessary to shift the transmission into neutral because these vehicles have transmissions that automatically shift into neutral when the engine RPM drops below the level needed to sustain a given road speed at the selected gear ratio.

In the cruising mode, immediately upon the engagement of the auxiliary motor drive system, the microcomputer will store the output of the speed sensor 92. The speed sensor 92 is of a well known type used to supply vehicle speed data to digital speedometers. After storing the initial cruising speed, the microcomputer 78 will control the variable resistance device 80 to maintain the output of the speed sensor at the initially stored level. Thus the variable resistance device 80 is controlled automatically to have the effect of a cruise control. A simple feedback control scheme is used to vary the resistance of device 80 in response to deviations of the vehicle speed from the operator selected cruising speed. For example, if the vehicle encounters a slight upward slope, more power will be required to maintain the same speed and consequently there will be a slight drop in speed. This slight drop in speed will be detected by the speed sensor 92 and will be conveyed to the microcomputer 78. In response, the microcomputer 78 will cause the resistance of the variable resistance device 80 to be reduced. This reduction in resistance has the effect of supplying more current to the motor 10a, thus directing more power to the vehicle's drive wheels 40 in order to bring the vehicle's speed back up to the operator selected cruising speed. Conversely, if the vehicle encounters a slight downward slope, the vehicle will speed up due to the action of gravity and less power will be required to maintain the same speed. This slight increase in speed will be detected by the speed sensor 92 and will be conveyed to the microcomputer 78. In response, the microcomputer 78 will cause the resistance of the variable resistance device 80 to be increased. This increase in resistance has the effect of reducing the current supplied to the motor 10a, thus directing less power to the vehicle's drive wheels 40 in order to bring the vehicle's speed back down to the operator selected cruising speed.

When the auxiliary motor drive system is engaged under highway cruising conditions and the vehicle's transmission is shifted into neutral, the vehicle's cruising speed will be maintained while the engine RPM drops to a significantly reduced level. With the auxiliary motor drive engaged at a given cruising speed, the vehicle can maintain the same speed at less than about half the engine RPM that would be required in the absence of the auxiliary motor drive system. In some cases, the vehicle can maintain a cruising speed at an engine RPM that is about one fourth the engine RPM that would have been required to maintain that same cruising speed in the absence of the auxiliary motor drive system. In fact the engine RPM may drop to a level at or near the idle RPM. Under such circumstances it would be expected that the number of miles traveled per gallon of fuel consumed would be greatly increased compared to the number of miles obtained from a gallon of fuel without the use of the auxiliary motor drive system. Also the amount of pollutants emitted into the atmosphere is greatly reduced. As an example, the engine speed of a vehicle which is ordinarily about two thousand RPM at a cruising speed of sixty five miles per hour, may drop to about five hundred RPM once the auxiliary motor drive system is engaged.

The braking function of the auxiliary motor drive system is effected by reversing the polarity of the electrical current supplied to the motor 10a. When the break sensor 94 detects the pressing of the break pedal, a signal to the microcomputer 78 is generated. Responsive to the signal from the break sensor 94, the microcomputer 78 will open switches 82 and 88 while closing switches 84 and 86, thus reversing the polarity of the electrical current supplied to the motor 10a. This reversed polarity causes a torque to be applied to the rotating element of the motor 10a which opposes the motion of the rotating element. The brake sensor 94 is of a well known type currently used to control the brake light of most vehicles.

While braking, the current supplied to the motor 10a must still pass through the variable resistance device 80. Therefore, the variable resistance device 80 can be used to control the amount of braking force provided by the auxiliary motor drive system. This feature is particularly useful in heavy trucks because it allows the driver to better control the truck speed when the truck is travelling downhill. Further, the belts 20 and 68 may be of the toothed type if desired.

It is to be understood that the present invention is not limited to the embodiments described above, but encompasses any and all embodiments within the scope of the following claims.

I claim:

1. An auxiliary motor direct drive system for installation in a vehicle having an engine, a gear ratio selection mechanism, at least one drive wheel for propelling the vehicle, and a drive train transferring torque from the gear ratio selection mechanism to the drive wheel, said auxiliary motor drive system comprising:

an auxiliary motor operably engageable to the main drive train of the vehicle intermediate the gear ratio selection mechanism and the drive wheel, so as to be capable of imparting torque to the drive wheel; and a driving device mountable in the vehicle, said driving device being operably engageable with and dependent upon the engine of the vehicle so as to derive power therefrom, said driving device being operably connected to said auxiliary motor so as to in turn power said auxiliary motor, effecting a substitution to the gear ratio selection mechanism, whereby when said auxiliary motor drive system is installed in the vehicle and said driving device is engaged to the engine so as to derive power therefrom, said auxiliary motor is engaged to the drive train so as to impart torque thereto at output requirements, and said driving device is powering said auxiliary motor by shifting the gear ratio selection mechanism to a neutral position, thus bypassing the gear ratio selection mechanism, the vehicle can cruise at a user selected vehicle speed with the engine running at a first engine speed that is lower than and in place of a second engine speed, the engine being required to run at the second engine speed to maintain the vehicle at the user selected vehicle speed when said auxiliary motor drive system is not being used.

2. The auxiliary motor drive system according to claim 1, wherein said auxiliary motor is a hydraulic motor and said driving device is a hydraulic pump.

3. The auxiliary motor drive system according to claim 2, wherein said auxiliary motor has a motor inlet and a motor outlet, and said driving device has a driving device inlet and a driving device outlet, said auxiliary motor drive system further comprising:

a quantity of driving fluid;

a supply conduit extending from said driving device outlet to said motor inlet so as to direct said driving fluid from said driving device outlet to said motor inlet;

a fluid return conduit extending from said motor outlet to said driving device inlet so as to direct said driving fluid from said motor outlet to said driving device inlet;

a first shunt conduit communicating with said supply conduit and said fluid return conduit; and a valve provided in said first shunt conduit, said valve allowing driving fluid to pass between said supply conduit and said fluid return conduit without passing through said auxiliary motor when said valve is open, said valve preventing driving fluid flow through said first shunt conduit when said valve is closed.

4. The auxiliary motor drive system according to claim 3, further comprising:

a second shunt conduit communicating with said supply conduit and said fluid return conduit; and a flow control valve provided in said second shunt conduit, said flow control valve providing for the continuous variation of driving fluid flow through said second shunt conduit to thereby control driving fluid supply to said auxiliary motor.

5. The auxiliary motor drive system according to claim 4, further comprising:
   a pressure relief valve provided intermediate said supply conduit and said fluid return conduit, said pressure relief valve opening when driving fluid pressure in said supply conduit reaches a predetermined upper limit of safe pressure.

6. The auxiliary motor drive system according to claim 5, further comprising:
   a four way two position valve positioned such that both said supply conduit and said fluid return conduit must pass therethrough, said four way two position valve being capable of assuming a first configuration and a second configuration, said four way two position valve dividing said supply conduit into a first portion extending from said driving device outlet to said four way two position valve and a second portion extending from said four way two position valve to said motor inlet, said four way two position valve dividing said fluid return conduit into a first portion extending from said driving device inlet to said four way two position valve and a second portion extending from said four way two position valve to said motor outlet, said four way two position valve allowing communication between said first portion of said supply conduit and said second portion of said supply conduit while allowing communication between said first portion of said fluid return conduit and said second portion of said fluid return conduit when said four way two position valve is in said first configuration, and said four way two position valve allowing communication between said first portion of said supply conduit and said second portion of said fluid return conduit while allowing communication between said first portion of said fluid return conduit and said second portion of said supply conduit when said four way two position valve is in said second configuration.

7. The auxiliary motor drive system according to claim 2, wherein said auxiliary motor has a motor inlet and a motor outlet, and said driving device has a driving device inlet and a driving device outlet, said auxiliary motor drive system further comprising:
   a quantity of driving fluid;
   a supply conduit extending from said driving device outlet to said motor inlet so as to direct said driving fluid from said driving device outlet to said motor inlet;
   a fluid return conduit extending from said motor outlet to said driving device inlet so as to direct said driving fluid from said motor outlet to said driving device inlet;
   a shunt conduit communicating with said supply conduit and said fluid return conduit; and
   a flow control valve provided in said shunt conduit, said flow control valve providing for the continuous variation of driving fluid flow through said shunt conduit to thereby control driving fluid supply to said auxiliary motor.

8. The auxiliary motor drive system according to claim 2, wherein said auxiliary motor has a motor inlet and a motor outlet, and said driving device has a driving device inlet and a driving device outlet, said auxiliary motor drive system further comprising:
   a quantity of driving fluid;
   a supply conduit extending from said driving device outlet to said motor inlet so as to direct said driving fluid from said driving device outlet to said motor inlet;
   a fluid return conduit extending from said motor outlet to said driving device inlet so as to direct said driving fluid from said motor outlet to said driving device inlet; and
   a pressure relief valve provided intermediate said supply conduit and said fluid return conduit, said pressure relief valve opening when driving fluid pressure in said supply conduit reaches a predetermined upper limit of safe pressure.

9. The auxiliary motor drive system according to claim 2, wherein said auxiliary motor has a motor inlet and a motor outlet, and said driving device has a driving device inlet and a driving device outlet, said auxiliary motor drive system further comprising:
   a quantity of driving fluid;
   a supply conduit extending from said driving device outlet to said motor inlet so as to direct said driving fluid from said driving device outlet to said motor inlet;
   a fluid return conduit extending from said motor outlet to said driving device inlet so as to direct said driving fluid from said motor outlet to said driving device inlet; and
   a four way two position valve positioned such that both said supply conduit and said fluid return conduit must pass therethrough, said four way two position valve being capable of assuming a first configuration and a second configuration, said four way two position valve dividing said supply conduit into a first portion extending from said driving device outlet to said four way two position valve and a second portion extending from said four way two position valve to said motor inlet, said four way two position valve dividing said fluid return conduit into a first portion extending from said driving device inlet to said four way two position valve and a second portion extending from said four way two position valve to said motor outlet, said four way two position valve allowing communication between said first portion of said supply conduit and said second portion of said supply conduit while allowing communication between said first portion of said fluid return conduit and said second portion of said fluid return conduit when said four way two position valve is in said first configuration, and said four way two position valve allowing communication between said first portion of said supply conduit and said second portion of said fluid return conduit while allowing communication between said first portion of said fluid return conduit and said second portion of said supply conduit when said four way two position valve is in said second configuration.

10. The auxiliary motor drive system according to claim 1, wherein said auxiliary motor is a pneumatic motor and said driving device is a pneumatic pump.

11. The auxiliary motor drive system according to claim 10, wherein said auxiliary motor has a motor inlet and a motor outlet, and said driving device has a driving device inlet and a driving device outlet, said auxiliary motor drive system further comprising:
   a quantity of driving fluid;
   a supply conduit extending from said driving device outlet to said motor inlet so as to direct said driving fluid from said driving device outlet to said motor inlet;
   a fluid return conduit extending from said motor outlet to said driving device inlet so as to direct said driving fluid from said motor outlet to said driving device inlet;
   a first shunt conduit communicating with said supply conduit and said fluid return conduit; and
   a valve provided in said first shunt conduit, said valve allowing driving fluid to pass between said supply conduit and said fluid return conduit without passing through said auxiliary motor when said valve is open, said valve preventing driving fluid flow through said first shunt conduit when said valve is closed.

12. The auxiliary motor drive system according to claim 10, wherein said auxiliary motor has a motor inlet and a motor outlet, and said driving device has a driving device inlet and a driving device outlet, said auxiliary motor drive system further comprising:

a quantity of driving fluid;

a supply conduit extending from said driving device outlet to said motor inlet so as to direct said driving fluid from said driving device outlet to said motor inlet;

a fluid return conduit extending from said motor outlet to said driving device inlet so as to direct said driving fluid from said motor outlet to said driving device inlet;

a shunt conduit communicating with said supply conduit and said fluid return conduit; and a flow control valve provided in said shunt conduit, said flow control valve providing for the continuous variation of driving fluid flow through said shunt conduit to thereby control driving fluid supply to said auxiliary motor.

13. The auxiliary motor drive system according to claim 10, wherein said auxiliary motor has a motor inlet and a motor outlet, and said driving device has a driving device inlet and a driving device outlet, said auxiliary motor drive system further comprising:

a quantity of driving fluid;

a supply conduit extending from said driving device outlet to said motor inlet so as to direct said driving fluid from said driving device outlet to said motor inlet;

a fluid return conduit extending from said motor outlet to said driving device inlet so as to direct said driving fluid from said motor outlet to said driving device inlet; and a pressure relief valve provided intermediate said supply conduit and said fluid return conduit, said pressure relief valve opening when driving fluid pressure in said supply conduit reaches a predetermined upper limit of safe pressure.

14. The auxiliary motor drive system according to claim 10, wherein said auxiliary motor has a motor inlet and a motor outlet, and said driving device has a driving device inlet and a driving device outlet, said auxiliary motor drive system further comprising:

a quantity of driving fluid;

a supply conduit extending from said driving device outlet to said motor inlet so as to direct said driving fluid from said driving device outlet to said motor inlet;

a fluid return conduit extending from said motor outlet to said driving device inlet so as to direct said driving fluid from said motor outlet to said driving device inlet; and a four way two position valve positioned such that both said supply conduit and said fluid return conduit must pass therethrough, said four way two position valve being capable of assuming a first configuration and a second configuration, said four way two position valve dividing said supply conduit into a first portion extending from said driving device outlet to said four way two position valve and a second portion extending from said four way two position valve to said motor inlet, said four way two position valve dividing said fluid return conduit into a first portion extending from said driving device inlet to said four way two position valve and a second portion extending from said four way two position valve to said motor outlet, said four way two position valve allowing communication between said first portion of said supply conduit and said second portion of said supply conduit while allowing communication between said first portion of said fluid return conduit and said second portion of said fluid return conduit when said four way two position valve is in said first configuration, and said four way two position valve allowing communication between said first portion of said supply conduit and said second portion of said fluid return conduit while allowing communication between said first portion of said fluid return conduit and said second portion of said supply conduit when said four way two position valve is in said second configuration.

15. The auxiliary motor drive system according to claim 1, wherein said auxiliary motor is an electric motor and said driving device is an electric generator.

16. The auxiliary motor drive system according to claim 15, wherein said electric motor has a motor input terminal and a motor output terminal, and said electric generator has a generator output terminal and a generator input terminal, said auxiliary motor drive system further comprising:

a supply conductor extending between said generator output terminal and said motor input terminal;

a ground conductor extending between said motor output terminal and said generator input terminal; and a variable resistance device through which electric current carried by said supply conductor passes, said variable resistance device controlling the amount of electric current supplied from said electric generator to said electric motor.

17. The auxiliary motor drive system according to claim 16, further comprising:

a third conductor extending between said supply conductor and said motor output terminal, said third conductor communicating with said supply conductor at a first node;

a fourth conductor extending between said ground conductor and said motor input terminal, said fourth conductor communicating with said ground conductor at a second node;

a first on/off switch provided in said supply conductor intermediate said first node and said motor input terminal;

a second on/off switch provided in said third conductor;

a third on/off switch provided in said ground conductor intermediate said second node and said motor output terminal; and a fourth on/off switch provided in said fourth conductor, whereby with said first and third switches closed and said second and fourth switches open, torque provided by said electric motor tends to move the vehicle in a forward direction, while with said first and third switches open and said second and fourth switches closed, torque provided by said electric motor opposes motion of the vehicle in the forward direction.

* * * * *